US007643677B2

(12) United States Patent
Hiraki et al.

(10) Patent No.: US 7,643,677 B2
(45) Date of Patent: Jan. 5, 2010

(54) IMAGE DISPLAY APPARATUS

(75) Inventors: Yukio Hiraki, Atsugi (JP); Izumi Kanai, Tokyo (JP); Kohei Inamura, Sagamihara (JP); Seiji Osawa, Aiko-gun (JP); Masaru Tada, Yokohama (JP); Nobuhiro Hoshi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 742 days.

(21) Appl. No.: 11/276,836

(22) Filed: Mar. 16, 2006

(65) Prior Publication Data

US 2006/0209097 A1 Sep. 21, 2006

(30) Foreign Application Priority Data

Mar. 17, 2005 (JP) ............................ 2005-077162
Mar. 10, 2006 (JP) ............................ 2006-066055

(51) Int. Cl.
*G06K 9/00* (2006.01)

(52) U.S. Cl. ................................................ 382/162

(58) Field of Classification Search ......... 382/162–167, 382/274–275; 345/589–605, 6, 12, 88, 63, 345/77; 358/1.9, 500–521; 348/51–60, 687, 348/649

See application file for complete search history.

(56) References Cited

U.S. PATENT DOCUMENTS

| | | | | |
|---|---|---|---|---|
| 6,980,176 | B2 * | 12/2005 | Matsumoto et al. | 345/6 |
| 7,199,839 | B2 | 4/2007 | Kim | 348/675 |
| 7,265,775 | B2 * | 9/2007 | Hirayama | 348/56 |
| 7,268,757 | B2 * | 9/2007 | Ben-David et al. | 345/88 |
| 2007/0052861 | A1 * | 3/2007 | Osawa et al. | 348/649 |

FOREIGN PATENT DOCUMENTS

| | | |
|---|---|---|
| JP | 6-261332 | 9/1994 |
| JP | 2003-208152 | 7/2003 |

* cited by examiner

*Primary Examiner*—Sherali Ishrat
(74) *Attorney, Agent, or Firm*—Fitzpatrick, Cella, Harper & Scinto

(57) ABSTRACT

In the image display device according to the present invention, control is performed such that a condition of not using a subsidiary pixel which corresponds to a specific color among the subsidiary pixels constituting a first pixel is selected as a condition for signal processing to output a signal for designating intensity of each subsidiary pixels constituting the first pixel, and a condition of using a subsidiary pixel which corresponds to a specific color among the subsidiary pixel constituting a second pixel is selected as a condition for signal processing to output a signal for designating intensity of each subsidiary pixels constituting the second pixel adjacent to the first pixel in the first direction.

7 Claims, 5 Drawing Sheets

FIG. 5

| INPUT SIGNAL | POSITION INFORMATION | CHROMATICITY VALUE | COLOR SEPARATION | | | | COLOR SEPARATION SELECTION NUMBER | SELECT COLOR SEPARATIONS |
|---|---|---|---|---|---|---|---|---|
| | (HORIZONTAL POSITION VERTICAL POSITION) | (x, y) | 201 (RGB) | 202 (GCR) | 203 (CBG) | 204 (BRC) | K | |
| S1 | (960, 540) | (0.2, 0.35) | × | ○ | ○ | × | 1 | 2 |
| S2 | (961, 540) | (0.2, 0.36) | × | ○ | ○ | × | 2 | 3 |
| S3 | (960, 541) | (0.19, 0.36) | × | ○ | ○ | × | 2 | 3 |
| S4 | (961, 541) | (0.2, 0.36) | × | ○ | ○ | × | 1 | 2 |

IMAGE DISPLAY APPARATUS

BACKGROUND OF THE INVENTION

1. Field of the Invention

The present invention relates to an image display apparatus.

2. Related Background Art

Japanese Patent Application Laid-open No. H06-261332 discloses a method for converting three-primary-color signals into multiple-primary-color signals. According to the method, positions of the transmitted three-primary-color signals on a chromaticity diagram are determined, and three colors are selected from among multiple primary colors based on the positions thus determined to thereby output the selected three colors as the multiple-primary-color signals.

Japanese Patent Application Laid-open No. 2003-208152 discloses a color signal processing device capable of achieving the display white based on four or more primary colors for display.

It is widely known that there is more than one solution to color separation which is performed for converting three-primary-color signals into multiple-primary-color signals. However, according to the methods disclosed in Japanese Patent Application Laid-open No. H06-261332 and in Japanese Patent Application Laid-open No. 2003-208152, only one solution preselected from among a plurality of solutions is used, irrespective of a position of the pixel or a display frame, to generate multiple-primary-color signals.

A display device commonly distributed has a structure in which various colors can be displayed based on three primary colors. Use of four or more primary colors makes it possible, for example, to extend a range of colors that can be reproduced. Even in a case where the four or more primary colors are used, there is no need to use all the primary colors to express each color within the range of colors, which can be displayed by less than four primary colors.

The inventors of the present invention have found that there occurs visual interference inherent to a display device that uses four or more primary colors.

SUMMARY OF THE INVENTION

An object of the present invention is to suppress reduction in image quality or to improve image quality in a display device using four or more colors.

The above object can be attained by an image display apparatus described below. That is, the image display apparatus includes:

a plurality of pixels;

a signal processing circuit; and a control circuit, in which:

each of the plurality of pixels comprises subsidiary pixels corresponding to tour or more primary colors;

the plurality of pixels are arranged such that subsidiary pixels corresponding to a same color are arranged in a first direction;

the signal processing circuit performs signal processing to output a signal for designating intensity of each subsidiary pixels constituting a pixel, based on an input signal for designating a color to be displayed in the pixel;

the control circuit selects a condition for the signal processing to output a signal for designating intensity of each of subsidiary pixels constituting a first pixel, such that the subsidiary pixels constituting the first pixel except for a subsidiary pixel which corresponds to a specific color is used; and the control circuit further selects a condition for the signal processing to output a signal for designating intensity of each subsidiary pixels constituting a second pixel adjacent to the first pixel in the first direction, such that, among the subsidiary pixels constituting the second pixel, a subsidiary pixel which corresponds to a specific color is used.

As regards the input signal for designating colors displayed in each pixel, a tristimulus value may be preferably used. An RGB signal or a color-difference signal may also be used as the input signal. It is preferable that the RGB signal or the color-difference signal, when used as the input signal, be converted into a tristimulus value before being subjected to signal processing for separating the signal into signals corresponding to the four or more primary colors.

It is not necessary to meet the condition that, for all adjacent pixels, "the control circuit selects a condition for the signal processing to output a signal for designating intensity of each of subsidiary pixels constituting a first pixel, such that the subsidiary pixels constituting the first pixel except for a subsidiary pixel which corresponds to a specific color is used".

It would be enough if the control circuit conducts the control such that, at least, a part of the adjacent pixels constituting the image frame meet the above condition. Moreover, it would be unnecessary that the first and second pixels are always fixed. When an image frame is formed, a part of the pixels meet the condition as the first and second pixels. And, at the time of forming the next image frame, pixels other than the first and second pixels of the previous image frame may meet the above condition of the first and second pixels within the scope of the present invention.

And, as a result of the random selection by the control circuit, at least, a part of the adjacent pixels may meet the above condition within the scope of the present invention.

Not all of the adjacent pixels meet the condition as the first and second pixels, and the first and second pixels are not fixed, in the each of following described inventions.

Also, it is possible to adopt another structure described below. That is, an image display apparatus includes:

a plurality of pixels;

a signal processing circuit; and a control circuit, in which:

each of the plurality of pixels has subsidiary pixels corresponding to four or more primary colors;

the signal processing circuit performs signal processing to output a signal for designating intensity of each subsidiary pixels constituting a pixel, based on an input signal for designating a color to be displayed in the pixel;

the control circuit selects a condition, for a first image, for the signal processing to output a signal for designating intensity of each of subsidiary pixels constituting a first pixel, such that the subsidiary pixels constituting the first pixel except for a subsidiary pixel which corresponds to a specific color is used; and the control circuit further selects a condition, for a second image adjacent in time to the first image, for the signal processing to output a signal for designating intensity of each subsidiary pixels constituting the first pixel, such that, among the subsidiary pixels constituting the first pixel, a subsidiary pixel which corresponds to a specific color is used.

Further, according to the present invention, a structure described below can be suitably adopted in which the signal processing circuit includes: a first circuit for performing signal processing under the condition that the subsidiary pixel except for one which corresponds to a specific color is used; and a second circuit for performing signal processing under the condition that the subsidiary pixel which corresponds to a specific color is used; and the control circuit selectively designates one of the first circuit and the second circuit included in the signal processing circuit.

In order to selectively designate the first circuit and the second circuit, it is possible to select one of the signals outputted from the first circuit and the second circuit or to specify that only one of the first circuit and the second circuit outputs the signal. When the four or more primary colors are composed of colors ranging from a first primary color to an n-th primary color, a structure described below is suitably adopted.

It is possible to suitably adopt a structure which includes each of circuits: a first circuit for performing signal processing under a condition that the first primary color is not used (a first circuit for performing signal processing on condition that at least three primary colors except the first primary color are used); a second circuit for performing signal processing on condition that the second primary color is not used (a second circuit for performing signal processing on condition that at least three primary colors except the second primary color are used); . . . ; and, an n-th circuit for performing signal processing on condition that the n-th primary color is not used (an n-th circuit for performing signal processing on condition that at least three primary colors except the n-th primary color are used).

In the present invention, various colors can be, adopted as the primary colors. Specifically, selected as the primary colors are a plurality of colors that can be visually synthesized in order to make various recognizable colors. Examples of such the colors include red, blue, green, and cyan.

It is also possible to adopt the following structures: a structure in which a condition for the signal processing is selected based on position information of pixel; a structure in which a condition for the signal processing is selected using random numbers; and a structure in which a condition for the signal processing is selected based on information on a frame.

The present invention makes it possible to suppress reduction in image quality or to improve image quality.

The problems described above are more noticeable in an image having pixels of the same color arranged in series or in an image having pixels with little color difference, particularly in a case where those images are static images. According to the present invention, it is possible to suppress reduction in image quality.

BRIEF DESCRIPTION OF THE DRAWINGS

FIG. 5 is an explanatory diagram showing in detail color separation processing according to a first embodiment;

DESCRIPTION OF THE PREFERRED EMBODIMENT

As described above, a display for displaying multiple primary colors (N-primary colors) by juxtaposition additive color mixing includes the subsidiary pixels whose number (N) is equal to that of the multiple primary colors, which increases an area of one pixel. Accordingly, a user can easily recognize the subsidiary pixel structure, which causes visual interference such as vertical stripes due to the pixel structure. A more specific explanation on this point is given below.

The following case is taken as an example. That is, one pixel is composed of four subsidiary pixels respectively including RGBC primary colors, which are horizontally arranged to be adjacent to one another. Such the pixels are aligned in columns to be arranged into a vertical stripe array (a first direction corresponds to a vertical direction of a screen) in a display. On the display, a certain display region is filled with a color T (that is, the same color is displayed in a vertical direction).

Figure 8:
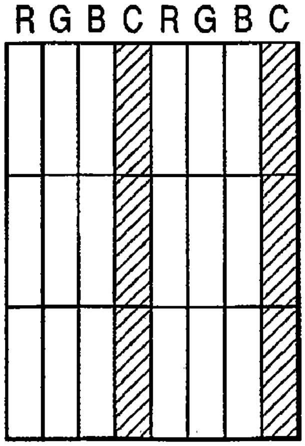
FIG. 8 is a schematic diagram showing a display state according to a conventional example.

In this case, when the color T is separated into three colors of R, G, and B as color separation 1, subsidiary pixels corresponding to a color C are not illuminated in the display region. As shown in FIG. 8, the unilluminated subsidiary pixels constitute stripes, which can be easily recognized as vertical stripes in the display region (shaded subsidiary pixels correspond to the unilluminated pixels). This problem is not limited to the case where the subsidiary pixels corresponding to the same color are arranged in a vertical direction. The same problem may also be caused in a case where the pixels are arranged to be vertically adjacent to one another, in which the subsidiary pixels corresponding to the same color are deviated from one another by 1/p pitch (1 pitch corresponds to a width of one pixel in a horizontal direction). Here, p is an integer larger than 2. In this case, the unilluminated subsidiary pixels are aligned in a slanting direction (with respect to the first direction), which can be easily recognized as oblique stripes.

The same visual interference may occur in a case where subsidiary pixels are arranged in a vertical direction in one pixel.

According to this embodiment, in a case where the color T can also be separated into three colors of R, G, and C as color separation 2, the color separation 2 and the color separation 1 are used in combination to display the display region.

Accordingly, the subsidiary pixels having different illumination patterns are arranged in the display region of the same display color, which smoothes out the displayed color intermittently continued in color reproduction, to thereby alleviate the visual interference. As a result, it is possible to attain high image quality, while promoting stability in color reproduction.

It is important for a display to have smooth gradations in color. According to an embodiment of the present invention, continuity in displayed color can be maintained in a multiple primary color display, which allows a display apparatus to have more tolerance for variations in display characteristics thereof to thereby attains cost reduction in production.

The embodiment according to the present invention is explained below.

An image display apparatus according to the present invention includes a liquid crystal display apparatus, a plasma display apparatus, and an electron beam display apparatus, each having a plurality of pixels which are driven in matrix addressed driving method, and preferably includes an image display apparatus in which colors are displayed based on juxtaposition additive color mixing.

Figure 1:
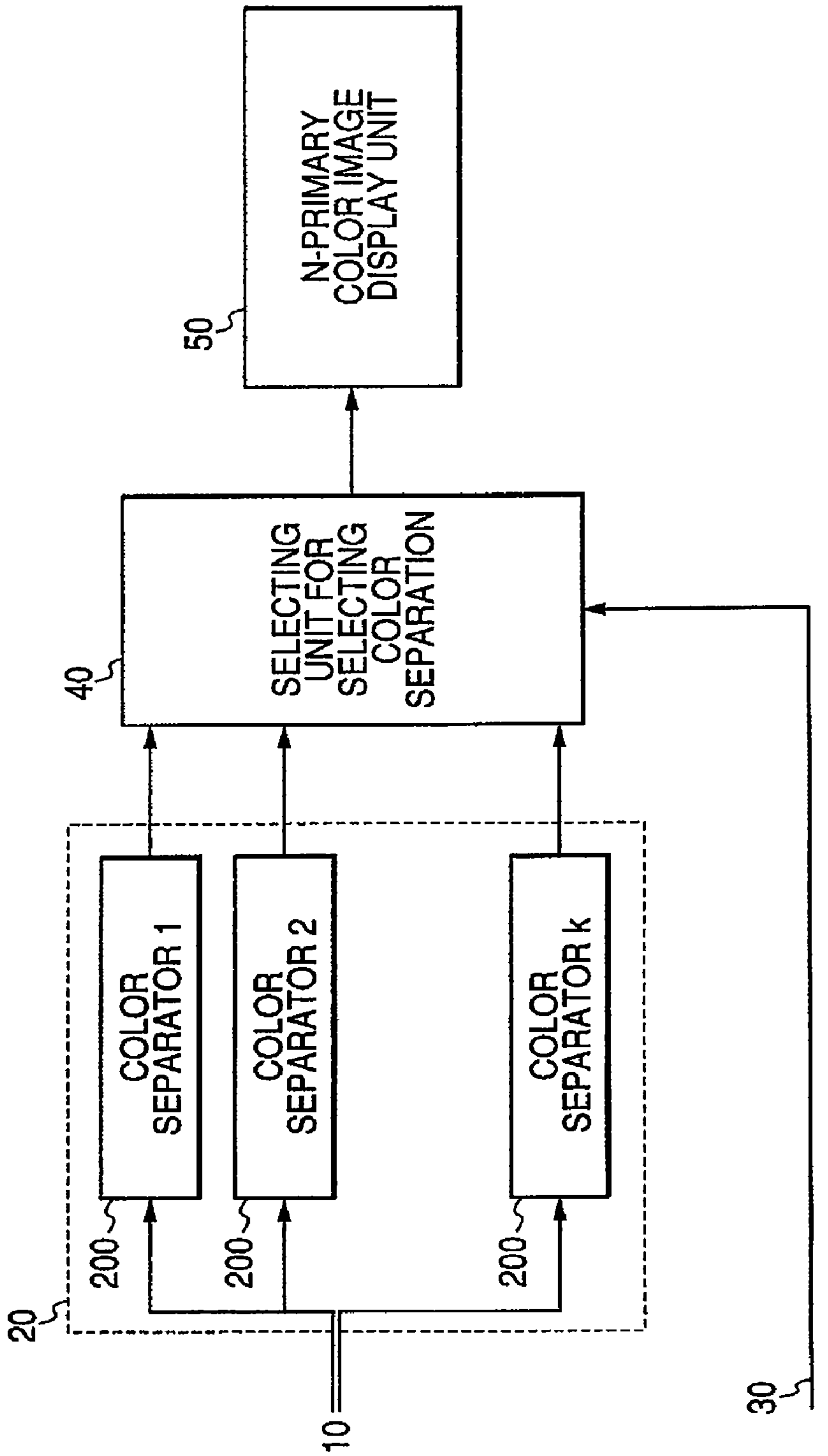
FIG. 1 is a block diagram of an image display apparatus according to the present invention.

In FIG. 1, input M stimulus value signals 10 ($M \geqq 3$, M is an integer) each are for expressing color information of a certain pixel.

Color separation means 20 is a signal processing circuit composed of a plurality of color separators 200 which correspond to circuits from a first circuit to an n-th circuit respectively. The color separation means 20 subjects the input M stimulus value signals 10 to color separation at each of the color separators 200 to output the signals as N-primary-color signals.

Here, N is larger than M (N>M), which means that the color separators 200 obtain indefinite solutions to color separations. It is preferable that the color separators 200 perform color separation under appropriate limiting conditions that are different from one another so that each obtains different solutions. Such the appropriate limiting conditions that are different from one another include: a condition of not using a signal of a specific primary color; and a condition of emphasizing a specific primary color value.

Under the limiting conditions, when there is no solution corresponding to the N-primary-color signal value, at least one of the N-primary-color signals outputted from the color separation means 20 has an unrealizable value (negative value, or a value exceeding a maximum tolerable value).

Display information 30 for the input M stimulus value signals is supplied to a selecting unit for selecting color separation 40. The display information 30 includes display pixel position information containing information on horizontal/vertical position on a screen and display frame information (display frame number). The display pixel position information or the display frame information does not need to be exact position information, and a part of the information such as the lower order digit thereof can be used.

The selecting unit for selecting a solution of color separation 40 selects one of the solutions to the color separations different from one another outputted from the color separation means 20, and outputs the selected solution. The selecting unit for selecting color separation 40 may select a solution based on any one of: random number information generated within the selecting unit for selecting color separation 40; display pixel position information; and display frame information.

Here, a solution to the color separation can be obtained by solving the following equation.

$$\vec{o} = O^{-1} \cdot I \cdot \vec{i}$$

where $$\vec{i}$$

is a vector having the input M value signals $$(i_1, i_2, \Lambda, i_M)^T$$

as elements;

$$I$$

is a matrix with 3 rows and M columns $$\begin{pmatrix} I_{1X} & I_{2X} & \Lambda & I_{MX} \\ I_{1Y} & I_{2Y} & \Lambda & I_{MY} \\ I_{1Z} & I_{2Z} & \Lambda & I_{MZ} \end{pmatrix}$$

for converting $$\vec{i}$$

into a display color system value of, for example, CIE1931XYZ;

$$\vec{o}$$

is a vector having the output N value signals $$(o_1, o_2, \Lambda, o_N)^T$$

as elements;

$$O^{-1}$$

is an inverse matrix of a matrix O with 3 rows and N columns $$\begin{pmatrix} O_{1X} & O_{2X} & \Lambda & O_{NX} \\ O_{1Y} & O_{2Y} & \Lambda & O_{NY} \\ O_{1Z} & O_{2Z} & \Lambda & O_{NZ} \end{pmatrix}$$

for converting $$\vec{o}$$

into a display color system value of, for example, CIE1931XYZ.

A predetermined limiting condition is applied to the inverse matrix, and the inverse matrix is solved by a known method to obtain the solution.

When there is no solution to the selected color separation, it is preferable to select another color separation one after another so that a possible solution can be obtained. When no solution is found for any of the color separations, an error value such as a negative value is outputted.

An N-primary color image display unit 50 has a structure in which each color pixel is composed of subsidiary pixels of N-primary colors, to which N-primary-color signals outputted by the selecting unit for selecting color separation 40 are inputted to illuminate each pixel.

Specific examples are provided as follows to describe the present invention in detail.

EXAMPLE 1

Example 1 is a specific case where tristimulus value signals are inputted four color separators are provided, and four primary colors are used for display.

In other words, M and N of FIG. 1 are defined as M=3 and k=N=4, respectively.

The tristimulus value adopts AbodeRGB value (primary color points: R (x=0.64, y=0.33); G (x=0.21, y=0.74); and B (x=0.15, y=0.06) and a basic stimulus (D65 light source)), which constitute a color space having wide color range proposed by Abode Systems, Inc.

Figure 2:
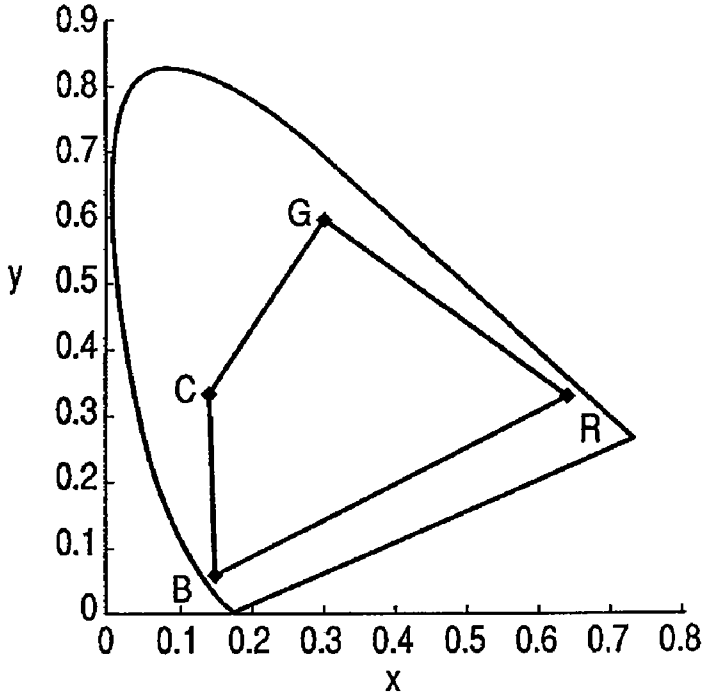
FIG. 2 is a chromaticity diagram for explaining a chromaticity of four-primary-color output.
Figure 3:
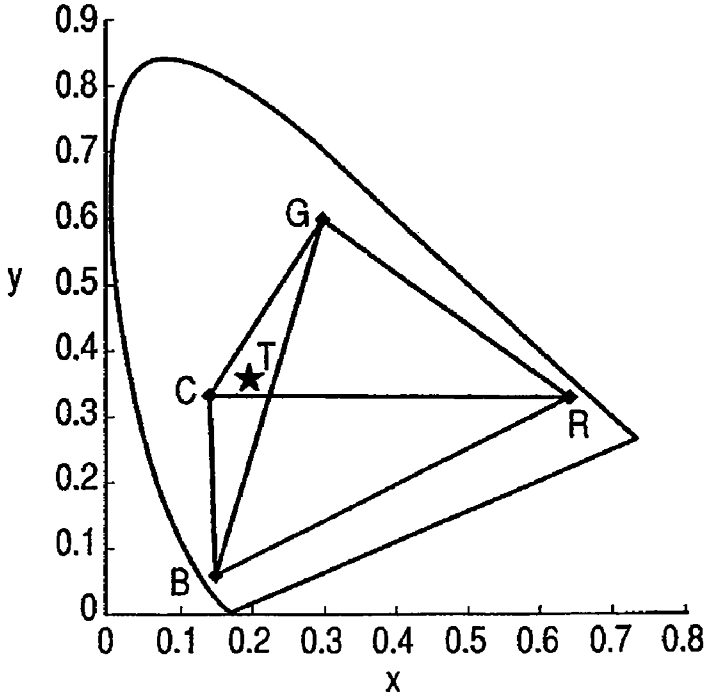
FIG. 3 is a chromaticity diagram for explaining color separation.

Adopted as a chromaticity value for each of the four primary colors is, as shown in FIG. 2, a three-primary-color RGB value of the European Broadcasting Union (EBU) system (primary color points: R (x=0.64, y=0.33); G (x=0.29, y=0.60); and B (x=0.15, y=0.06), a basic stimulus (D65 light source), and a fourth primary color value (primary color point: C (x=0.14, y=0.33))).

In a four-primary color display apparatus-thus structured, four color separators 200 perform color separations of FIG. 1 each using three primary colors out of the four primary colors for the sake of simple calculation.

For example, a color separator 1 uses primary colors of RGB for color separation, a color separator 2 uses primary colors of GCR for color separation, a color separator 3 uses primary colors of CBG for color separation, and a color separator 4 uses primary colors of BRC for color separation.

The color separator 1 outputs a set of signals each designating intensity of respective subsidiary pixels of R, G, and B. When the set of signals outputted from the color separator 1 is selected for displaying a given pixel, a subsidiary pixel of C is not illuminated (OFF). The color separator 2 outputs a set of signals each designating intensity of respective subsidiary pixels of G, C, and R. When the set of signals outputted from the color separator 2 is selected for displaying a given pixel, a subsidiary pixel of B is not illuminated (OFF). The color separator 3 outputs a set of signals each designating intensity of respective subsidiary pixels of C, B, and G. When the set of signals: outputted from the color separator 3 is selected for displaying a given pixel, a subsidiary pixel of R is not illuminated (OFF). The color separator 4 outputs a set of signals each designating intensity of respective subsidiary pixels of B, R, and C. When the set of signals outputted from the color separator 4 is selected for displaying a given pixel, a subsidiary pixel of G is not illuminated (OFF).

In Example 1, the display information 30 includes the least significant one bit of horizontal/vertical information (IX, IY) based on an input tristimulus signals 10 to be supplied as display pixel position information, which is necessary and sufficient information for selecting a signal from among signals outputted by the color separation means 20 based on four solutions.

Figure 4:
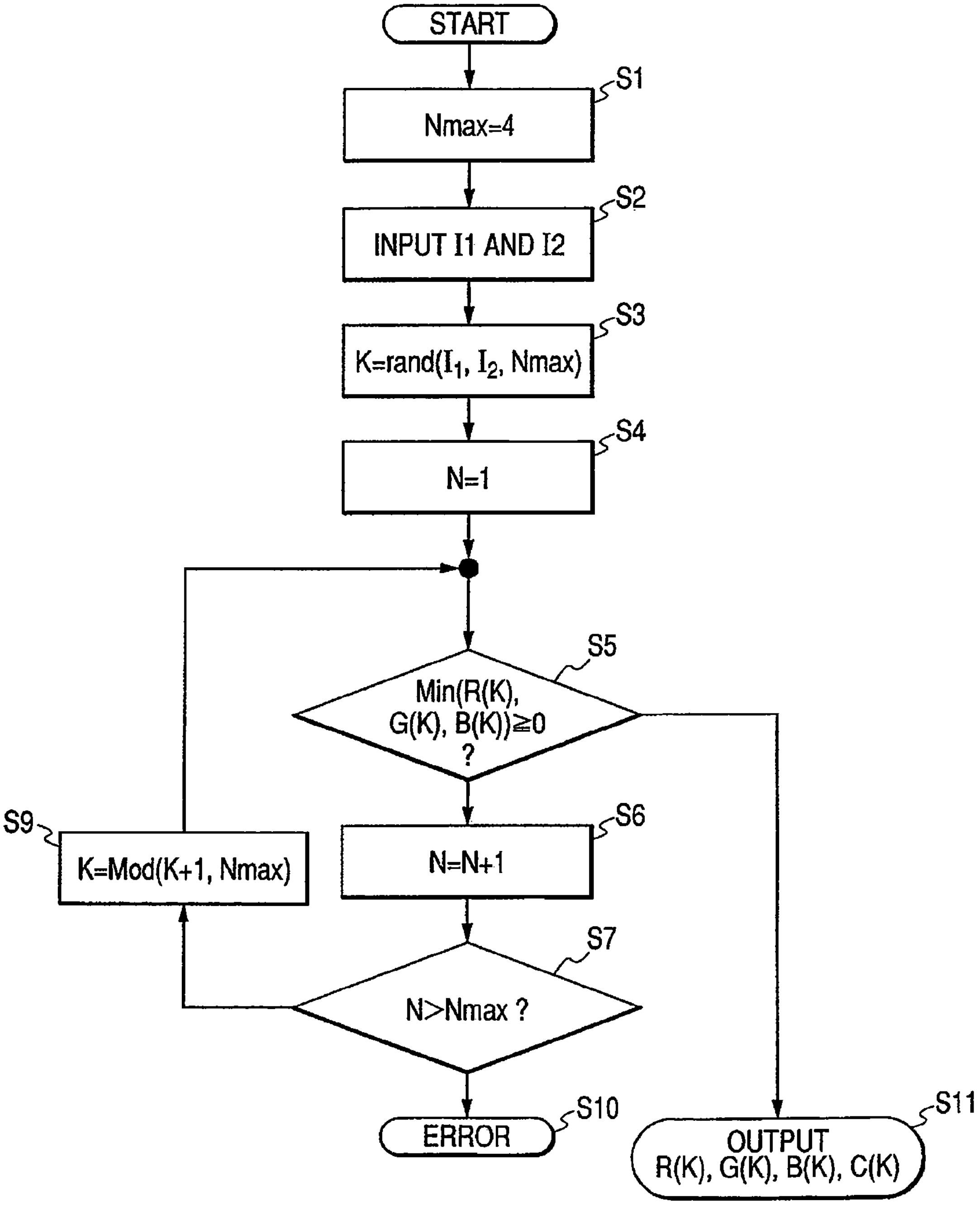
FIG. 4 is a flowchart for explaining an operation of selecting unit for selecting color separation.

The selecting unit for selecting color separation 40 follows an operation sequence shown by the flow chart of FIG. 4.

The selecting unit for selecting a solution of color separation 40 starts operation to set Nmax in Step 1, i.e., the number of the color separation means that can be selected.

Then, in Step 2, the selecting unit for selecting color separation 40 inputs display pixel position information I1 and I2. In Example 1, I1 and I2 each correspond to one bit of information.

Next, in Step 3, the selecting unit for selecting color separation 40 generates a random number, which corresponds to a color separation selection number K based on I1, I2, and Nmax. The random number to be generated should be in a range of 0 to Nmax, and in Example 1, any one of 0, 1, 2, and 3 is outputted as K.

After that, in Step 4, the number of searches conducted for color separation (hereinafter referred to as the number of searches) N is initialized to 1.

Then, in Step 5, color separation elements R(K)r G(K), B(K), and C(K) indicated by the color separation selection number K are checked for validity. Specifically, for checking the validity, it is judged whether or not the minimum value for each of the color separation elements is equal to or larger than 0, or whether or not the values for the color separation elements include a value exceeding the maximum tolerable value, because an invalid solution contains at least one color separation element has a negative value or the value exceeding the maximum tolerable value.

When it is judged as valid in Step 5, color separation elements indicated by the color separation selection number K are outputted in Step 11, and the selecting unit for selecting color separation 40 ends its processing.

When it is judged as invalid in Step 5, the selecting unit for selecting color separation 40, starts another selection operation for obtaining another solution.

In Step 6, the number of searches N is incremented, and in Step 7, it is judged whether the incremented number N exceeds Nmax, the number of the color separation means that can be selected.

When it is judged as N exceeding Nmax, the process moves to Step 10 to output an error state.

When it is judged as N being below Nmax, the next color separation selection number K is calculated in Step 9, and the process jumps to Step 5.

The operation of the selecting unit for selecting color separation 40 is described above.

Next, operation for color separation is further explained with reference to FIG. 5.

As shown in FIG. 5, a case where input tristimulus signals S1, S2, S3, and S4 are inputted is considered. Each of the signals has display pixel position information and a chromaticity value.

Figure 6:
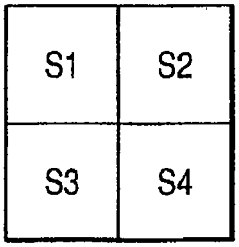
FIG. 6 is a schematic diagram for explaining a pixel arrangement according to the first embodiment.

Those signals correspond to pixels having similar chromaticity values, which are arranged to be adjacent to one another as shown in FIG. 6.

The least significant one bit of the display pixel position information is used as the display pixel position information for horizontal position and vertical position, and converted by the selecting unit for selecting color separation 40 into the color separation selection number K in Step 3 of the operation of the selecting unit for selecting color separation 40 as described above.

The color separation means 20 supplies the input tristimulus signals to the four color separators 200 to obtain solutions for color separation. In FIG. 5, "o" and "x" in columns under "color separation" indicate cases where a solution is obtained and where a solution is not obtained, respectively.

The selecting unit for selecting color separation 40 selects the output from the color separators 200, which is indicated as "select color separations" in FIG. 5.

Figure 7:
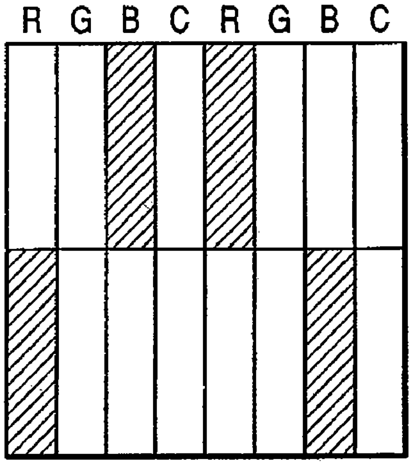
FIG. 7 is a schematic diagram showing a display state according to the first embodiment.

A four-primary color image display unit 50 display an image based on color separation thus selected. FIG. 7 schematically shows a display state, in which unilluminated subsidiary pixels (shaded pixels) are randomly dispersed in terms of position.

Example 1 discloses the case where color separation is performed using three primary colors out of the four primary colors in a four-primary color display apparatus, for the sake of simple calculation, and it is also possible that the color separators 200 perform color separation different from one another by using all the four primary colors.

It is also possible that only one color separator is used, and by changing parameters for matrix calculation performed by the color separator according to locations of pixels, conditions for color separation is selected according to each of the pixels.

EXAMPLE 2

In Example 1, visual interference is eliminated by spatially dispersing the unilluminated subsidiary pixels. In Example 2, unilluminated subsidiary pixels are dispersed in terms of time to eliminate visual interference.

Similarly to Example 1, the input tristimulus signals of S1 to S4, corresponding to four pixels adjacent to one another, for displaying substantially the same color are inputted to the color separation means 200. The output of color separators 2 and 3 which have obtained solutions to the color separation to the selecting unit for selecting color separation 40. At this time, frame information is inputted as the display information 30, which is one bit of information having "0" for an even-numbered frame and "1" for an odd-numbered frame. The selecting unit for selecting color separation 40 selects output from the color separator 2 for the even-numbered frame, and selects output from the color separator 3 for the odd-numbered frame, and output the selected output. As a result, a three-primary color image display unit 50 displays an image in which each frame has unilluminated pixels at different positions.

This application claims priorities from Japanese Patent Applications No. 2005-077162 filed on Mar. 17, 2005, and No. 2006-066055 filed on Mar. 10, 2006, which are hereby incorporated by reference herein.

What is claimed is:

1. An image display apparatus, comprising:

a plurality of pixels;

a signal processing circuit; and a control circuit, wherein:

each of the plurality of pixels comprises subsidiary pixels corresponding to four or more primary colors;

the plurality of pixels are arranged such that subsidiary pixels corresponding to a same color are arranged in a first direction;

the signal processing circuit performs a signal processing to output a signal for designating intensity of each subsidiary pixels constituting a pixel, based on an input signal for designating a color to be displayed in the pixel;

the control circuit selects a condition for the signal processing to output a signal for designating intensity of each of subsidiary pixels constituting a first pixel, such that subsidiary pixels constituting the first pixel except for a subsidiary pixel which corresponds to a specific color is used; and the control circuit further selects a condition for the signal processing to output a signal for designating intensity of each subsidiary pixels constituting a second pixel adjacent to the first pixel in the first direction, such that, among the subsidiary pixels constituting the second pixel, a subsidiary pixel which corresponds to a specific color is used.

2. An image display apparatus, comprising:

a plurality of pixels;

a signal processing circuit; and a control circuit, wherein:

each of the plurality of pixels has subsidiary pixels corresponding to four or more primary colors;

the signal processing circuit performs signal processing to output a signal for designating intensity of each subsidiary pixels constituting a pixel, based on an input signal for designating a color to be displayed in the pixel;

the control circuit selects a condition, for a first image, for the signal processing to output a signal for designating intensity of each of subsidiary pixels constituting a first pixel, such that the subsidiary pixels constituting the first pixel except for a subsidiary pixel which corresponds to a specific color is used; and the control circuit further selects a condition, for a second image adjacent in time to the first image, for the signal processing to output a signal for designating intensity of each subsidiary pixels constituting the first pixel, such that, among the subsidiary pixels constituting the first pixel, a subsidiary pixel which corresponds to a specific color is used.

3. An image display apparatus according to claim 1, wherein:

the signal processing circuit comprises:

a first circuit for performing signal processing under the condition that the subsidiary pixel except for one corresponding to a specific color is used; and a second circuit for performing signal processing under the condition that the subsidiary pixel corresponding to a specific color is used; and the control circuit selectively designates one of the first circuit and the second circuit included in the signal processing circuit.

4. An image display apparatus according to claim 2, wherein:

the signal processing circuit comprises:

a first circuit for performing signal processing under the condition that the subsidiary pixel except for one which corresponds to a specific color is used;

a second circuit for performing signal processing under the condition that the subsidiary pixel which corresponds to a specific color is used; and the control circuit selectively designates one of the first circuit and the second circuit included in the signal processing circuit.

5. An image display apparatus according to claim 1, wherein a condition for the signal processing is selected based on pixel position information.

6. An image display apparatus according to claim 1, wherein a condition for the signal processing is selected based on random numbers.

7. An image display apparatus according to claim 1, wherein a condition for the signal processing is selected based on frame information for display.

* * * * *